(12) United States Patent
Onodera et al.

(10) Patent No.: US 8,003,911 B2
(45) Date of Patent: Aug. 23, 2011

(54) WIRE ELECTRICAL DISCHARGE MACHINING APPARATUS

(75) Inventors: Yasuo Onodera, Chiyoda-ku (JP);
Tatsushi Sato, Chiyoda-ku (JP);
Takashi Hashimoto, Chiyoda-ku (JP);
Hisashi Yamada, Chiyoda-ku (JP);
Koichiro Hattori, Chiyoda-ku (JP);
Yoshikazu Ukai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 309 days.

(21) Appl. No.: 12/445,207

(22) PCT Filed: Oct. 24, 2006

(86) PCT No.: PCT/JP2006/321181
§ 371 (c)(1),
(2), (4) Date: Apr. 10, 2009

(87) PCT Pub. No.: WO2008/050407
PCT Pub. Date: May 2, 2008

(65) Prior Publication Data
US 2010/0084378 A1    Apr. 8, 2010

(51) Int. Cl.
*B23H 7/04* (2006.01)
*B23H 1/02* (2006.01)
(52) U.S. Cl. .................. 219/69.12; 219/69.13
(58) Field of Classification Search ............... 219/69.12, 219/69.13, 69.16, 69.18; 700/162
See application file for complete search history.

(56) References Cited

U.S. PATENT DOCUMENTS

| | | | | |
|---|---|---|---|---|
| 4,652,717 A * | 3/1987 | Briffod et al. | .............. | 219/69.12 |
| 4,675,491 A * | 6/1987 | Marendaz | .................. | 219/69.12 |
| 5,306,889 A * | 4/1994 | Kaneko et al. | ............. | 219/69.12 |
| 7,119,300 B2 * | 10/2006 | Liang et al. | ................ | 219/69.12 |
| 7,638,726 B2 * | 12/2009 | Hashimoto et al. | ........ | 219/69.12 |
| 2008/0110865 A1* | 5/2008 | Hashimoto et al. | ........ | 219/69.12 |
| 2010/0012626 A1* | 1/2010 | Onodera et al. | ........... | 219/69.13 |

FOREIGN PATENT DOCUMENTS

| | | | |
|---|---|---|---|
| EP | 678356 A1 * | 10/1995 | |
| JP | 59-47123 A | 3/1984 | |
| JP | 60-29230 A | 2/1985 | |
| JP | 61-95826 A | 5/1986 | |
| JP | 61-288930 A | 12/1986 | |
| JP | 1-97525 A | 4/1989 | |
| JP | 2-30429 A | 1/1990 | |
| JP | 6-61663 A | 8/1994 | |

* cited by examiner

*Primary Examiner* — Geoffrey S Evans
(74) *Attorney, Agent, or Firm* — Sughrue Mion, PLLC

(57) ABSTRACT

A machining-energy calculating unit accumulates a discharge current value for each discharge position to calculate a machining energy in a certain time period from the present time to the past time. An energy-distribution changing unit determines the presence or absence of imbalance in the energy by obtaining a machining energy distribution in an up-down direction of the machining gap based on the machining energy, and when there is imbalance, the energy-distribution changing unit produces a new open/close pattern in which a machining energy distribution that eliminates the imbalance. Power feeding is then performed based on the new open/close pattern.

15 Claims, 4 Drawing Sheets

WIRE ELECTRICAL DISCHARGE MACHINING APPARATUS

TECHNICAL FIELD

The present invention relates to a wire electrical discharge machining apparatus.

BACKGROUND ART

In a wire electrical discharge machining apparatus, a wire as one electrode is running in an up-down direction and is arranged to be opposed to a workpiece as the other electrode that is controlled to move on a plane perpendicular to the wire running direction. A pulse discharge is caused in a machining gap between the wire and the workpiece (i.e., inter-electrode gap), and the workpiece is machined into a desired shape by utilizing heat energy generated due to the discharge.

In the wire electrical discharge machining apparatus, in a configuration for supplying power to the machining electrodes, the workpiece is directly connected to one electrode of a machining power supply and the running wire is connected to the other electrode of the machining power supply through a feeding point on which the wire is slidable. Generally, two feeding points are provided; one above and the other below the workpiece. In other words, there are two circuits in parallel on upper and lower sides of the workpiece as paths for a discharge current flowing in the wire.

The wire electrical discharge machining apparatus generally employs two machining power supplies: a sub discharge power supply for inducing spark discharge (pre-discharge) with small current and a main discharge power supply for supplying large current as a machining current after generation of the spark discharge to perform rough machining and finish machining.

In the wire electrical discharge machining apparatus, wire breakage sometimes occurs depending upon the machining conditions. If the discharge is concentrated at one point, the wire electrode is locally overheated, which results in wire breakage. Conventionally, various technologies have been proposed for preventing wire breakage by preventing the local overheating of the wire electrode (for example, see Patent Documents 1 to 3 and the like).

Specifically, a technology is disclosed in Patent Document 1 in which switching elements are provided on each current path from a main discharge power supply to upper and lower side feeding points for opening and closing the current paths individually so that a one-side feeding for supplying a main machining current from only one of the feeding points is performed, and an upper-side feeding only from the upper-side and a lower-side feeding only from the lower side are switched every predetermined number of continuously applied pulse voltages. With this technology, large current can be applied without overheating the wire electrode, enabling to prevent wire breakage due to the heat generation.

In Patent Document 2, a technology is disclosed in which switching elements are provided on each current path from a main discharge power supply to upper and lower side feeding points for opening and closing the current paths individually so that a one-side feeding for supplying a main machining current from only one of the feeding points is performed, and an upper-side feeding and a lower-side feeding are switched asynchronously. With this technology, occurrence of a concentrated discharge can be prevented, so that breakage of the wire electrode due to heating can be prevented.

In Patent Document 3, a technology is disclosed in which a device is provided for measuring a discharge position in an up-down direction in a machining gap based on a difference and a magnitude relation of current flowing from a sub discharge power supply to an upper-side feeding point and a lower-side feeding point, and switching elements are provided on each current path from a main discharge power supply to the upper-side feeding point and the lower-side feeding point for opening and closing the current paths individually. When spark discharge occurs on the upper end side in the machining gap, the upper-side feeding is performed, when spark discharge occurs on the lower end side in the machining gap, the lower-side feeding is performed, and when spark discharge occurs at the center of a workpiece in a thickness direction, an upper-and-lower-both-side feeding for supplying current from upper-and-lower-both sides simultaneously is performed. The local overheating of the wire electrode in the center in the up-down direction in the machining gap in which cooling effect tends to be insufficient can be prevented by switching the feeding system in accordance with the discharge position.

In a wire electrical discharge machining apparatus, as disclosed in Patent Document 2, machining liquid nozzles are generally provided on the wire running path between the upper and lower wire guides at positions that are close in the up-down direction with an opposing position to the workpiece therebetween, and a wire electrode is cooled and discharge machining swarf is removed by ejecting a high-pressure machining liquid into the machining gap from upward and downward.

Patent Document 1: Japanese Patent Application Laid-open No. S59-47123
Patent Document 2: Japanese Patent Application Laid-open No. H1-97525
Patent Document 3: Japanese Examined Patent Publication No. H6-61663

DISCLOSURE OF INVENTION

Problem to be Solved by the Invention

In the upper-and-lower-both-side feeding system, if there is deviation of impedance between two circuits in parallel on upper and lower sides of the machining gap as paths for a discharge current, it results in causing difference between discharge current values supplied from the upper-side feeding path and the lower-side feeding path to a discharging position. Therefore, when concentrated discharge occurs, a wire electrode is overheated on a side having a larger discharge current value, causing wire breakage more easily. Performing the upper-side feeding and the lower-side feeding as disclosed in Patent Documents 1 and 2 is effective in preventing wire breakage due to the concentrated discharge; however, when only one-side feeding is performed, short circuit occurs frequently, thereby lowering machining speed.

In the technology disclosed in Patent Document 3, the one-side feeding system and the upper-and-lower-both-side feeding system are used in combination, and therefore is considered to enable stable machining by preventing the frequent short circuit. However, wire breakage is still a problem because it occurs due to not only the cooling performance of a wire electrode by machining liquid but also imbalance in a machining energy, that is, locally excessive machining energy by the concentrated discharge.

In other words, even on the upper and lower end sides of the machining gap where the wire electrode is cooled enough, if imbalance in the machining energy occurs by the concentrated discharge, wire breakage occurs. It is described in Patent document 3 that overheating of the wire electrode that causes wire breakage is attributed to insufficient cooling in the center in the up-down direction in the machining gap. However, this can be solved by adjusting the amount of the machining liquid to be ejected. Even when the cooling in the center in the up-down direction in the machining gap is improved, if there is imbalance in the machining energy, wire breakage occurs in the same way.

The present invention has been achieved in view of the above, and it is an object of the present invention to provide a wire electrical discharge machining apparatus capable of improving machining speed by preventing wire breakage due to imbalance in energy that may occur in an inter-electrode gap.

Means for Solving Problem

To achieve the above objects, there is provided a wire electrical discharge machining apparatus that, when comprising an upper-side path that passes through an upper-side feeding point on which a wire electrode is slidable on an upper side of a workpiece and a lower-side path that passes through a lower-side feeding point on which the wire electrode is slidable on a lower side of the workpiece as feeding paths for supplying a discharge current from a machining power supply to an inter-electrode gap that is a machining gap between the wire electrode and the workpiece, includes an upper-side-path open/close unit and a lower-side-path open/close unit capable of separately opening and closing the upper-side path and the lower-side path; an open/close pattern setting unit that performs power feeding in a manner in which a one-side feeding system using either one of the upper-side path and the lower-side path and an upper-and-lower-both-side feeding system simultaneously using both of the upper-side path and the lower-side path are mixed, and sets an open/close pattern for controlling opening and closing of the upper-side-path open/close unit and the lower-side-path open/close unit separately or simultaneously, as an instruction for realizing a desired feeding mode in each of the one-side feeding system and the upper-and-lower-both-side feeding system; a discharge position detecting unit that detects a discharge position based on any of a sub discharge current value and a main discharge current value supplied from the upper-side feeding point and the lower-side feeding point to the inter-electrode gap; a machining energy calculating unit that calculates a machining energy at a present position of the wire electrode based on the main discharge current value for every discharge position that is detected by the discharge position detecting unit in a certain period from a present time to a past time; a machining-energy-distribution changing unit that, when there is imbalance in machining energy distribution in an up-down direction of the machining gap obtained based on the machining energy calculated by the machining energy calculating unit, generates a new open/close pattern in which the machining energy distribution is changed to obtain a predetermined machining energy distribution for eliminating the imbalance; and a driving unit that, upon receiving the new open/close pattern from the machining energy distribution changing unit, performs an open/close control of the upper-side-path open/close unit and the lower-side-path open/close unit, which is to be performed in accordance with an open/close pattern from the open/close pattern setting unit, in accordance with the new open/close pattern.

According to the present invention, in the process of performing a main discharge by a feeding system mixing an upper-and-lower-both-side feeding and two one-side feedings that are formed by individually opening and closing path open/close units provided on upper and lower side feeding paths from a machining power supply to a machining gap (inter-electrode gap) with open/close patterns that are preset in an open/close pattern setting unit, a machining-energy calculating unit accumulates a main discharge current value for each discharge position to calculate a machining energy in a certain time period from the present time to the past time, and an energy-distribution changing unit determines the presence or absence of imbalance in the energy by obtaining a machining energy distribution in an up-down direction of the machining gap based on the machining energy and, when there is imbalance in the energy, changes to open/close patterns in which a machining energy distribution that eliminates the imbalance is obtained for performing power feeding that eliminates the imbalance. Thus, wire breakage due to energy imbalance that may occur in the inter-electrode gap can be prevented, and machining speed can be improved.

Effect of the Invention

According to the present invention, wire breakage due to energy imbalance that can occur in an inter-electrode gap can be prevented, and machining speed can be improved.

Figure 1:
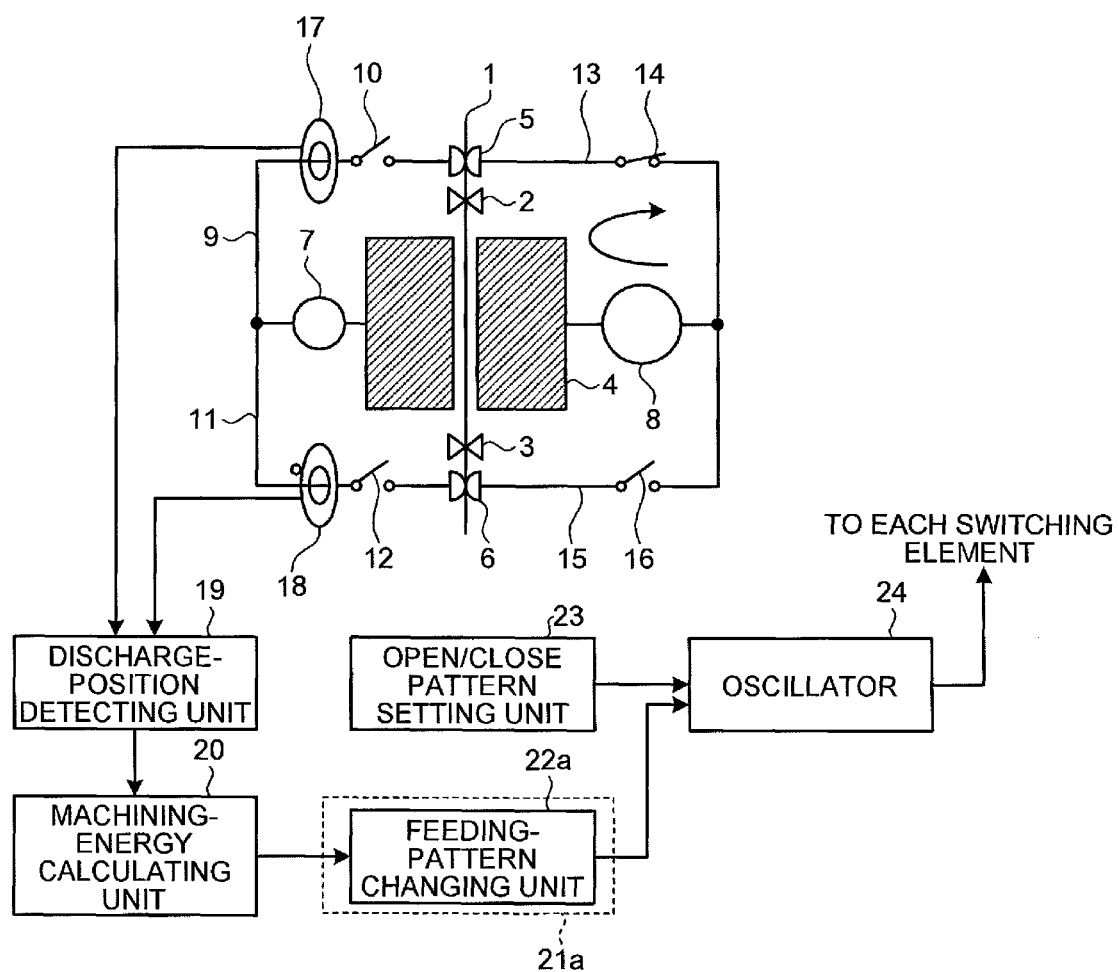
FIG. 1 is a schematic diagram illustrating a configuration of a relevant portion of a wire electrical discharge machining apparatus according to a first embodiment of the present invention.

EXPLANATIONS OF LETTERS OR NUMERALS 1 wire electrode
2 upper-side wire guide
3 lower-side wire guide
4 workpiece
5 upper feeding point
6 lower feeding point
7 sub-discharge power supply
8 main-discharge power supply
9 upper sub-feeder line
10 upper sub-switching element
11 lower sub-feeder line
12 lower sub-switching element
13 upper main-feeder line
14 upper main-switching element
15 upper main-feeder line
16 lower main-switching element
17, 18 current sensor
19 discharge-position detecting unit
20 machining-energy calculating unit 21a, 21b, 21c, 21d machining-energy-distribution changing unit
22a, 22b feeding-pattern changing unit
23 open/close pattern setting unit
24 oscillator
25a, 25b feeding-pulse-energy changing unit
26 reference-machining-energy setting unit

BEST MODE(S) FOR CARRYING OUT THE INVENTION

Exemplary embodiments of a wire electrical discharge machining apparatus according to the present invention will be explained below in detail with reference to the accompanying drawings.

First Embodiment

FIG. 1 is a schematic diagram illustrating a configuration of a relevant portion of a wire electrical discharge machining apparatus according to the first embodiment of the present invention. In FIG. 1, reference numeral 1 denotes a wire electrode. The wire electrode 1 runs, for example from upward to downward, while being guided by wire guides 2, 3 arranged in an up-down direction with an appropriate interval therebetween. A plate-shaped workpiece 4 having a certain thickness is arranged on a plane perpendicular to a wire running direction to be opposed to a wire running path between the upper and lower side wire guides 2, 3 with a predetermined machining gap therefrom (hereinafter, "inter-electrode gap"). An upper feeding point 5 is provided at a position near the upper-side wire guide 2 and a lower feeding point 6 is provided at a position near the lower-side wire guide 3. The wire electrode 1 is slidable on the upper and lower feeding points 5, 6.

Machining liquid nozzles, although not shown, are provided on the wire running path between the wire guides 2, 3 at positions that are close in the up-down direction with an opposing position to the workpiece 4 therebetween. High-pressure machining liquid is ejected from the machining liquid nozzles into the machining gap from upward and downward, so that the wire electrode 1 can be cooled and discharge machining swarf can be removed.

A general configuration of a discharge machining unit is explained above. The wire electrical discharge machining apparatus includes a sub-discharge power supply 7 and a main-discharge power supply 8 as machining power supplies for the discharge machining unit. The sub-discharge power supply 7 mainly generates a voltage pulse of a relatively low voltage for supplying a sub-discharge small current to the inter-electrode gap for detecting a state of the machining gap (inter-electrode gap) between the wire electrode 1 and the workpiece 4. The main-discharge power supply 8 mainly generates a voltage pulse of a predetermined pulse width at a predetermined voltage level that is higher than the sub-discharge power supply 7 for supplying a main-discharge large current for machining to the inter-electrode gap.

One electrode end of the sub-discharge power supply 7 is directly connected to the workpiece 4. The other electrode end of the sub-discharge power supply 7 is connected to the upper feeding point 5 through an upper sub-feeder line 9, and an upper sub-switching element 10 is inserted on the upper sub-feeder line 9. At the same time, the other electrode end of the sub-discharge power supply 7 is connected to the lower feeding point 6 through a lower sub-feeder line 11, and a lower sub-switching element 12 is inserted on the lower sub-feeder line 11.

One electrode end of the main-discharge power supply 8 is directly connected to the workpiece 4. The other electrode end of the main-discharge power supply 8 is connected to the upper feeding point 5 through an upper main-feeder line 13, and an upper main-switching element 14 is inserted on the upper main-feeder line 13. At the same time, the other electrode end of the main-discharge power supply 8 is connected to the lower feeding point 6 through a lower main-feeder line 15, and a lower main-switching element 16 is inserted on the lower main-feeder line 15.

Semiconductor switching elements are used here as the switching elements 10, 12, 14, 16; however, relays can also be used in the same manner.

In this manner, there are two circuits in parallel, one on the upper side and the other on the lower side of the workpiece 4, as paths for a discharge current flowing toward the wire electrode 1 from each of the sub-discharge power supply 7 and the main-discharge power supply 8. Moreover, a switching element is provided on each of those current paths for opening and closing the path. Therefore, the main discharge current can be supplied from the main-discharge power supply 8 while switching between two systems of an upper-and-lower-both-side feeding system using both of the upper and lower feeding points and a one-side feeding system using either one of the feeding points.

In other words, in the above configuration, when the upper and lower sub-switching elements 10, 12 are simultaneously turned on, the upper and lower sub-feeder lines 9, 11 are closed, and a pulse voltage output from the sub-discharge power supply 7 is applied to the machining gap (inter-electrode gap) between the wire electrode 1 and the workpiece 4 through the upper and lower sub-feeder lines 9, 11 and the upper and lower feeding points 5, 6. In response to this, when a sub discharge (pre-discharge) generated in the inter-electrode gap is detected, one or both of the upper and lower main-switching elements 14, 16 are turned on, and a pulse voltage output from the main-discharge power supply 8 is applied to the inter-electrode gap to supply the main discharge current in either one of the one-side feeding system using the upper-side feeding path or the lower-side feeding path and the upper-and-lower-both-side feeding system using both of the upper and lower side feeding paths simultaneously.

Specifically, in the one-side feeding system using the upper-side feeding path, when the upper main-switching element 14 is turned on and the lower main-switching element 16 is turned off, only the upper main-feeder line 13 is closed, so that the main discharge current is supplied to the inter-electrode gap through the upper main-feeder line 13 and the upper feeding point 5.

On the other hand, in the one-side feeding system using the lower-side feeding path, when the upper main-switching element 14 is turned off and the lower main-switching element 16 is turned on, only the lower main-feeder line 15 is closed, so that the main discharge current is supplied to the inter-electrode gap through the lower main-feeder line 15 and the lower feeding point 6.

In the upper-and-lower-both-side feeding system using both of the upper and lower side feeding paths simultaneously, when the upper and lower main-switching elements 14, 16 are simultaneously turned on, the upper and lower main-feeder lines 13, 15 are closed simultaneously, so that the main discharge current is supplied to the inter-electrode gap through the upper and lower main-feeder lines 13, 15 and the upper and lower feeding points 5, 6.

The on-off control of the upper and lower sub-switching elements 10, 12 and the upper and lower main-switching elements 14, 16 is performed in response to a driving signal from an oscillator 24 to be described below. At the time of supplying the main discharge current by performing the on-off control of the upper and lower main-switching elements 14, 16, the on-off control of the upper and lower sub-switching elements 10, 12 is performed in conjunction with the corresponding upper and lower main-switching elements 14, 16 for the purpose thereof. The on-off control of the upper and lower main-switching elements 14, 16 is mainly explained.

As described above, the causes of the wire breakage include imbalance in a machining energy, i.e., the machining energy becomes locally excessive due to occurrence of concentrated discharge, in addition to cooling performance of the wire electrode by the machining liquid.

Accordingly, in the first embodiment, current sensors 17, 18, a discharge-position detecting unit 19, a machining-energy calculating unit 20, a machining-energy-distribution changing unit 21a, an open/close pattern setting unit 23, and the oscillator 24 are provided so that the main discharge current can be supplied to the inter-electrode gap from the main-discharge power supply 8 by performing the on-off control of the upper and lower main-switching elements 14, 16 to reduce imbalance in the machining energy that may occur in the inter-electrode gap in such power supply configuration. The machining-energy-distribution changing unit 21a includes a feeding-pattern changing unit 22a.

Figure 2:
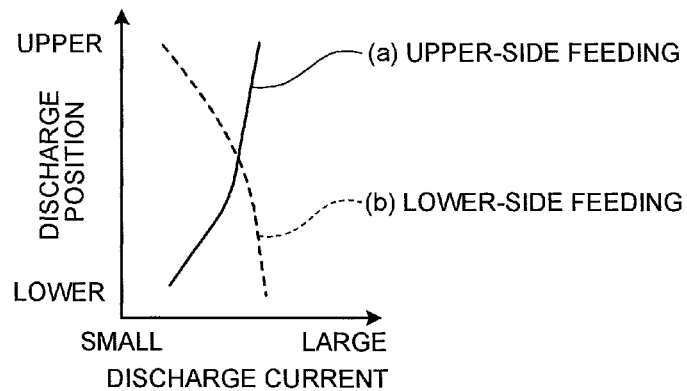
FIG. 2 is a diagram for explaining a relation between a discharge position and a discharge current value at the time of each of power feedings of an upper-side feeding and a lower-side feeding.

A method of preventing wire breakage by minimizing imbalance in the machining energy caused in the inter-electrode gap is explained by referring to FIGS. 1 and 2 before explaining configuration and operation of the above. FIG. 2 is a diagram for explaining a relation between a discharge position and a discharge current value at the time of each of the one-side feedings of an upper-side feeding and a lower-side feeding.

In the wire electrical discharge machining apparatus, the pulse voltage is first applied from the sub-discharge power supply 7 to an opposing gap (inter-electrode gap) between the wire electrode 1 and the workpiece 4 to generate the sub discharge (pre-discharge). Thereafter, a pulse voltage is subsequently applied to the inter-electrode gap from the main-discharge power supply 8 to supply the main discharge current.

In this case, the main discharge current at the time of the upper-side feeding in which only the upper main-switching element 14 is turned on returns to the main-discharge power supply 8 through the upper feeding point 5, the wire electrode 1, the discharge path in the machining gap, and the workpiece 4. In this discharge current path, impedance from the main-discharge power supply 8 to the discharge position increases with an increase in the distance between the discharge position and the upper feeding point 5. Therefore, as characteristics (a) shown in FIG. 2, the main discharge current at the time of the upper-side feeding is large when the discharge position is at the upper end side of the machining gap and is small when the discharge position is at the lower end side of the machining gap.

The main discharge current at the time of the lower-side feeding in which only the lower main-switching element 16 is turned on returns to the main-discharge power supply 8 through the lower feeding point 6, the wire electrode 1, the discharge path in the machining gap, and the workpiece 4. In this discharge current path, impedance from the main-discharge power supply 8 to the discharge position increases with an increase in the distance between the discharge position and the lower feeding point 6 contrary to the above. Therefore, as characteristics (b) shown in FIG. 2, the main discharge current at the time of the lower-side feeding is small when the discharge position is at the upper end side of the machining gap and is large when the discharge position is large at the lower end side of the machining gap.

That is, when the machining energy is large at the upper end side of the machining gap at the time of the upper-side feeding or the upper-and-lower-both-side feeding, the feeding mode is switched to the lower-side feeding, and when the machining energy is small at the lower end side of the machining gap at the time of the lower-side feeding or the upper-and-lower-both-side feeding, the feeding mode is switched to the upper-side feeding. Moreover, each feeding mode on the upper and lower sides is adjusted to reduce a difference in the machining energy between the upper and lower end sides of the machining gap at the time of the upper-and-lower-both-side feeding. In this manner, imbalance in the machining energy can be minimized, enabling to prevent wire breakage and improve machining speed.

Therefore, the open/close pattern setting unit 23 shown in FIG. 1 initializes three open/close patterns. The three open/close patterns include a pattern that is an instruction for generating a path for causing a sub discharge by closing the upper and lower sub-feeder lines 9, 11 by performing the on-off control of the upper and lower sub-switching elements 10, 12 simultaneously. The three open/close patterns include two other patterns that are required at the time of supplying the main discharge current thereafter. The two other patterns include a pattern for closing the upper and lower main-feeder lines 13, 15 simultaneously by performing the on-off control of the upper and lower main-switching elements 14, 16 and a pattern for closing one of the upper and lower main-feeder lines 13, 15 and opening the other one. When the three open/close patterns are initialized, the timing of the on-off control of the upper and lower main-switching elements 14, 16 and the number of the on-off controls of the upper and lower main-switching elements 14, 16 (the number of power feedings) are set in each of the three open/close patterns so that short circuit does not occur frequently and machining speed is satisfactory when feeding power from the corresponding feeding path.

The open/close pattern setting unit 23 first outputs the open/close pattern that is an instruction for generating a path for causing a sub discharge, and then outputs the above three open/close patterns at the time of supplying the main discharge current thereafter, to the oscillator 24 to be described below, thereby performing the two one-side feeding systems and the upper-and-lower-both-side feeding system mixed at a predetermined ratio.

The current sensor 17 measures the sub discharge current flowing in the upper sub-feeder line 9 at the time of the sub discharge and outputs the measured value to the discharge-position detecting unit 19. The current sensor 18 measures the sub discharge current flowing in the lower sub-feeder line 11 at the time of the sub discharge and outputs the measured value to the discharge-position detecting unit 19 in the same manner. The current sensors 17, 18 can be provided on the upper and lower main-feeder lines 13, 15 for measuring the main discharge current.

The machining-energy calculating unit 20 accumulates the main discharge current value for various discharge positions calculated and detected by the discharge-position detecting unit 19 during a machining-energy accumulating time period when the power feeding is performed under the condition of the open/close patterns set by the open/close pattern setting unit 23 at the time of the main discharge. Moreover, by using the accumulated values, the machining-energy calculating unit 20 calculates the machining energy at the present machining position of the wire electrode 1 that moves in the up-down direction.

The machining-energy accumulating time period needed for calculating the machining energy is a time interval defining the past time from the present time during which the discharge current value is accumulated as the machining energy. The machining energy can be accumulated in units of moving distance of the wire electrode in the up-down direction or the number of discharge pulses. The machining energy in a certain time period from the present time to the past time is explained to be obtained by accumulating it with time, however, can be obtained by performing averaging with, for example, a low pass filter.

The longer or shorter machining-energy accumulating time period makes it impossible to obtain a correct machining energy distribution at the present machining position at the machining-energy-distribution changing unit 21a. Therefore, the machining-energy accumulating time period needs to be set appropriately in the following method.

That is, if the machining-energy accumulating time period is too short, only a small number of discharge pulses can be sampled during that short period, so that appropriate machining energy distribution cannot be obtained. Therefore, the accumulating time period needs to be at least 100 μsec considering a general discharge frequency of the wire electrical discharge machining apparatus and the appropriate number of discharge pulses for obtaining the machining energy distribution.

On the other hand, if the accumulating time period is too long, the discharge current value at a position at which the wire electrode 1 has already passed is also accumulated as the machining energy, so that the machining energy cannot be obtained correctly at a moving position of the wire electrode 1 in the up-down direction. Thus, the accumulating time period needs to be shorter than a time period needed for machining for a distance of five times of a diameter of the wire electrode.

The machining-energy-distribution changing unit 21a memorizes the machining energy in an appropriately predetermined accumulating time period as a target machining energy. If the machining energy in the accumulating time period is set large, machining speed is improved, however wire breakage easily occurs. In the case of a small machining energy, the case will be opposite. Therefore, the machining-energy-distribution changing unit 21a memorizes the machining energy in the accumulating time period to balance machining speed with possibility of wire breakage as the target machining energy.

Then, the machining-energy-distribution changing unit 21a obtains the machining energy distribution in the up-down direction in the machining gap in the present power feeding state by the open/close patterns set by the open/close pattern setting unit 23 based on the machining energy calculated by the machining-energy calculating unit 20, and determines the presence or absence of imbalance in the machining energy based on a magnitude relation between the obtained machining energy distribution and the target machining energy. If there is imbalance in the machining energy distribution, the machining-energy-distribution changing unit 21a generates new open/close patterns that make it possible to obtain a predetermined machining energy distribution that neutralizes the imbalance, and outputs those new open/close patterns to the oscillator 24.

There are two modes for generating the open/close patterns. In the first mode, open/close patterns are generated in which the machining energy distribution is changed to reduce the difference of the machining energy between the upper end side and the lower end side in the machining gap. In the second mode, open/close patterns are generated in which the machining energy calculated by the machining-energy calculating unit 20 is changed to be close to the target machining energy.

The machining-energy-distribution changing unit 21a in the first embodiment includes the feeding-pattern changing unit 22a as a unit for specifically realizing the above two modes. In other words, the feeding-pattern changing unit 22a realizes the first mode by changing the open/close patterns set by the open/close pattern setting unit 23 into open/close patterns in which the ratio of the number of power feedings between from the upper-side path and from the lower-side path is made different in accordance with the degree of imbalance of the present machining energy, and issuing the changed open/close patterns to the oscillator 24.

Specifically, when the machining energy distribution is smaller than the target machining energy, i.e., when there is no imbalance in the machining energy, the feeding-pattern changing unit 22a generates open/close patterns with the same contents as the open/close patterns set by the open/close pattern setting unit 23 and outputs the generated open/close patterns to the oscillator 24.

When the machining energy distribution is larger than the target machining energy on the upper end side in the machining gap, the feeding-pattern changing unit 22a generates open/close patterns in which the ratio of the number of the lower-side feedings in the open/close patterns set by the open/close pattern setting unit 23 is changed to be higher than a predetermined value and outputs the generated open/close patterns to the oscillator 24.

When the machining energy distribution is larger than the target machining energy on the lower end side in the machining gap, the feeding-pattern changing unit 22a generates open/close patterns in which the ratio of the number of the upper-side feedings in the open/close patterns set by the open/close pattern setting unit 23 is changed to be higher than a predetermined value and outputs the generated open/close patterns to the oscillator 24.

The feeding-pattern changing unit 22a realizes the second mode in the following manner. That is, the feeding-pattern changing unit 22a changes the open/close patterns set by the open/close pattern setting unit 23 into open/close patterns in which the ratio of the number of power feedings is made different between the one-side feeding using the upper-side path and the one-side feeding using the lower-side path in accordance with the magnitude of the machining energy calculated by accumulating the main discharge current values at all discharge positions during the accumulating time period appropriately set by the machining-energy calculating unit 20, and outputs the changed open/close patterns to the oscillator 24.

When the power feeding is performed in accordance with the open/close patterns received from the open/close pattern setting unit 23, if the open/close patterns received from the feeding-pattern changing unit 22a are the same as those received from the open/close pattern setting unit 23, the oscillator 24 uses the open/close patterns received from the open/close pattern setting unit 23. In other words, the oscillator 24 continues outputting driving signals for performing the on-off control of the corresponding switching elements the number of power feedings set by using the ratio of the number of power feedings specified for the open/close patterns received from the open/close pattern setting unit 23.

Therefore, when there is no imbalance in the machining energy that may cause wire breakage, in the inter-electrode gap (machining gap), the power feeding is performed based on the open/close patterns set by the open/close pattern setting unit 23 in which the two one-side feedings and the upper-and-lower-both-side feeding are mixed. The open/close patterns set by the open/close pattern setting unit 23 is such that the ratio of the number of power feedings is set to cause few short circuits and be excellent in machining speed. Thus, machining speed can be improved.

When the power feeding is performed in the above described mixed mode in accordance with the open/close patterns received from the open/close pattern setting unit 23, if the open/close patterns received from the feeding-pattern changing unit 22a are different from those received from the open/close pattern setting unit 23, the oscillator 24 does not use the open/close patterns received from the open/close pattern setting unit 23, and outputs driving signals for performing the on-off control of the switching elements to perform the power feeding in the ratio of the number of power feedings specified for the specified feeding path (one of the two one-side feeding paths) in accordance with the open/close patterns received from the feeding-pattern changing unit 22a.

Accordingly, when there is imbalance in the machining energy that may cause wire breakage, in the inter-electrode gap at the time of one of the one-side feedings of the upper-side feeding and the lower-side feeding, the power feeding is performed based on the open/close patterns in which the ratio of the number of power feedings is changed high by switching to the other one-side feeding, enabling to prevent wire breakage at the time of the one-side feeding.

When the power feeding is performed based on the open/close patterns that are received from the feeding-pattern changing unit 22a and that are changed from those set by the open/close pattern setting unit 23 so that the ratio of the number of power feedings is made different between the two one-side feedings and the upper-and-lower-both-side feeding in accordance with the magnitude of the machining energy calculated by the machining-energy calculating unit 20 during the accumulating time period, wire breakage can be prevented and machining speed can be improved.

According to the first embodiment, the presence or absence of imbalance in the machining energy is determined based on the machining energy distribution obtained from the machining energy in a certain time period from the present time to the past time, and when there is a difference in the machining energy between the upper and lower side feeding paths to the degree that causes wire breakage, power feeding is performed by switching the currently performed open/close patterns to those in which the ratio of the number of power feedings is changed to reduce the machining energy difference. Thus, wire breakage can be prevented more reliably.

Moreover, the power feeding is performed by switching the currently performed open/close patterns to those in which the ratio of the number of power feedings is changed to be different between the upper-and-lower-both-side feeding and the two one-side feedings in accordance with the magnitude of the machining energy in a certain period from the present time to the past time. Thus, wire breakage can be prevented and machining speed can be improved.

Second Embodiment

Figure 3:
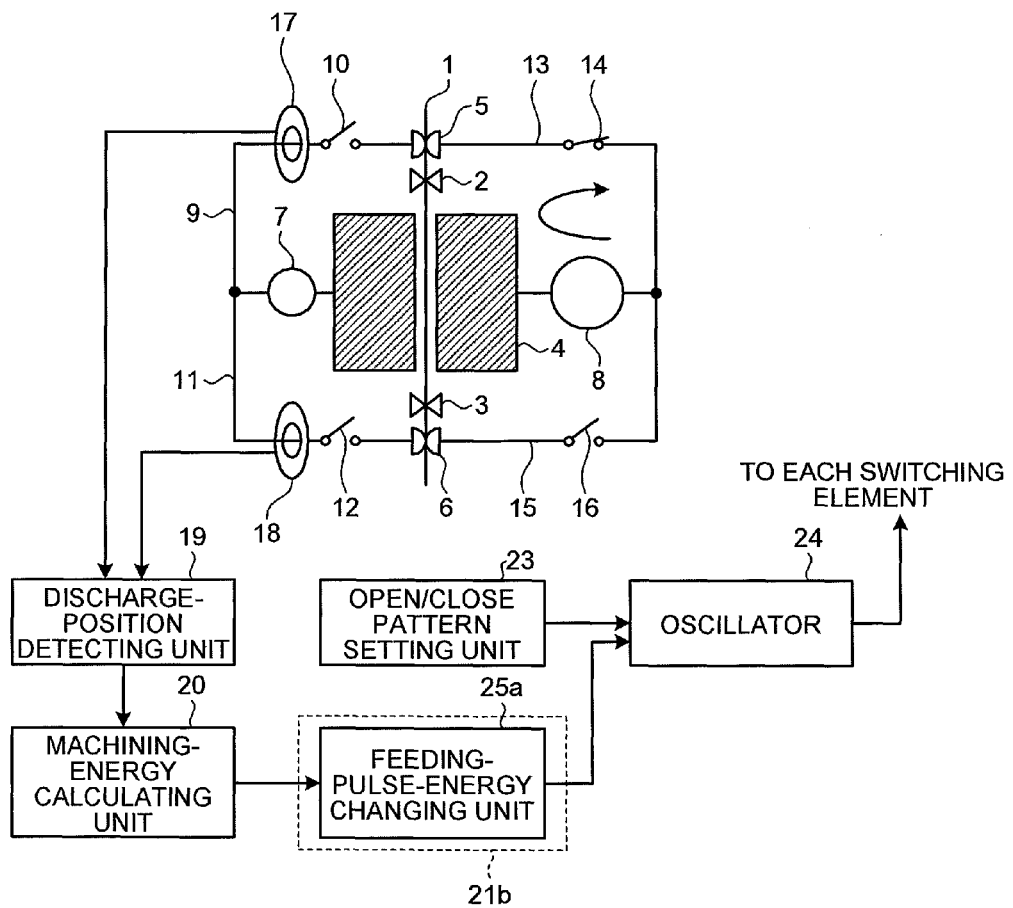
FIG. 3 is a schematic diagram illustrating a configuration of a relevant portion of a wire electrical discharge machining apparatus according to a second embodiment of the present invention.

FIG. 3 is a schematic diagram illustrating a configuration of a relevant portion of a wire electrical discharge machining apparatus according to the second embodiment of the present invention. In FIG. 3, the components that are the same or similar to those shown in FIG. 1 (first embodiment) are denoted by the same reference numerals. The components peculiar to the second embodiment are mainly explained below.

In the second embodiment, a method of eliminating imbalance in the machining energy by changing a feeding pulse energy is explained. Specifically, as shown in FIG. 3, the wire electrical discharge machining apparatus according to the second embodiment includes a machining-energy-distribution changing unit 21b instead of the machining-energy-distribution changing unit 21a in the configuration shown in FIG. 1 (first embodiment), and the machining-energy-distribution changing unit 21b includes a feeding-pulse-energy changing unit 25a.

A target machining energy with which machining can be performed with less wire breakage at high machining speed is memorized in the machining-energy-distribution changing unit 21b. The machining-energy-distribution changing unit 21b obtains the machining energy distribution in the up-down direction in the machining gap in the present power feeding state by the open/close patterns set by the open/close pattern setting unit 23 based on the machining energy calculated by the machining-energy calculating unit 20, and determines the presence or absence of imbalance in the machining energy based on a magnitude relation between the obtained machining energy distribution and the target machining energy. If there is imbalance in the machining energy distribution, the machining-energy-distribution changing unit 21b generates open/close patterns changed to obtain a predetermined machining energy distribution for eliminating the imbalance and outputs the open/close patterns to the oscillator 24.

There are two modes for generating the open/close patterns. In the first mode, open/close patterns are generated in which the machining energy distribution is changed to reduce the difference of the machining energy between the upper end side and the lower end side in a thickness direction of the workpiece 4. In the second mode, open/close patterns are generated, in which the machining energy calculated by the machining-energy calculating unit 20 is changed to be close to the target machining energy.

The machining-energy-distribution changing unit 21b in the second embodiment includes the feeding-pulse-energy changing unit 25a as a unit for specifically realizing the above two modes. The feeding-pulse-energy changing unit 25a changes the feeding pulse energy per feeding pulse. The method of changing the feeding pulse energy includes a method of increasing or decreasing a feeding current value and a method of increasing or decreasing a feeding time length, any of which can be employed. Examples of a specific configuration are explained below.

Specifically, when employing the method of increasing or decreasing the feeding current value, a plurality of the upper and lower main-switching elements 14, 16 is provided respectively in parallel so that the number of the switching elements that are turned on simultaneously in each of the upper and lower sides can be increased or decreased. In this case, the number of the switching elements that are turned on simultaneously is determined in accordance with the physical characteristics such as impedance of the discharge current path. When employing the method of increasing or decreasing the feeding time length, because the upper and lower main-switching elements 14, 16 can be controlled to turn on and off individually, only the on-operation time length of each switching element is increased or decreased. The on-operation time length to be increased or decreased at this case is also determined in accordance with the physical characteristics such as impedance of the discharge current path.

The feeding-pulse-energy changing unit 25a realizes the first mode by changing the open/close patterns set by the open/close pattern setting unit 23 into open/close patterns in which the feeding pulse energy is made different between for the time of the power feeding from the upper-side path and the power feeding from the lower-side path in accordance with the degree of imbalance of the present machining energy, and issuing the changed open/close patterns to the oscillator 24.

Specifically, when the machining energy distribution is smaller than the target machining energy, i.e., when there is no imbalance in the machining energy, the feeding-pulse-energy changing unit 25a generates open/close patterns with the same contents as the open/close patterns set by the open/close pattern setting unit 23 and outputs the generated open/close patterns to the oscillator 24.

When the machining energy distribution is larger than the target machining energy on the upper end side of the workpiece 4, the feeding-pulse-energy changing unit 25a generates open/close patterns in which the feeding pulse energy at the time of the upper-side feeding by the open/close patterns set by the open/close pattern setting unit 23 is changed to be smaller than a predetermined value or the feeding pulse energy at the time of the lower-side feeding by the open/close patterns set by the open/close pattern setting unit 23 is changed to be larger than a predetermined value, and outputs the generated open/close patterns to the oscillator 24.

When the machining energy distribution is larger than the target machining energy on the lower end side of the workpiece 4, the feeding-pulse-energy changing unit 25a generates open/close patterns in which the feeding pulse energy at the time of the upper-side feeding by the open/close patterns set by the open/close pattern setting unit 23 is changed to be larger than a predetermined value or the feeding pulse energy at the time of the lower-side feeding by the open/close patterns set by the open/close pattern setting unit 23 is changed to be smaller than a predetermined value, and outputs the generated open/close patterns to the oscillator 24.

At the time of the both-upper-and-lower-side feeding by the open/close patterns set by the open/close pattern setting unit 23, the feeding-pulse-energy changing unit 25a can perform the above process of changing the feeding pulse energy simultaneously in the upper-side feeding and the lower-side feeding.

The feeding-pulse-energy changing unit 25a realizes the second mode in the following manner. That is, the feeding-pulse-energy changing unit 25a changes the open/close patterns set by the open/close pattern setting unit 23 into open/close patterns in which the feeding pulse energy is made different between the two one-side feedings each using one of the upper and lower side paths and the both-upper-and-lower-side feeding using both of the paths simultaneously in accordance with the magnitude of the machining energy calculated by accumulating the main discharge current values at all discharge positions during the accumulating time period appropriately set by the machining-energy calculating unit 20, and outputs the changed open/close patterns to the oscillator 24.

When the power feeding is performed in accordance with the open/close patterns received from the open/close pattern setting unit 23, if the open/close patterns received from the feeding-pulse-energy changing unit 25a are the same as those received from the open/close pattern setting unit 23, the oscillator 24 uses the open/close patterns received from the open/close pattern setting unit 23. In other words, the oscillator 24 continues outputting driving signals for performing the on-off control of the corresponding switching elements so that feeding pulse energy same as the currently performed one is supplied.

Therefore, when there is no imbalance in the machining energy that may cause wire breakage, in the inter-electrode gap, the power feeding is performed based on the open/close patterns set by the open/close pattern setting unit 23 in which the two one-side feedings and the upper-and-lower-both-side feeding are mixed. When the open/close patterns set by the open/close pattern setting unit 23 are performed, high feeding pulse energy that causes few short circuits and is excellent in machining speed can be supplied to the feeding path, so that machining speed can be improved.

When the power feeding is performed in the above described mixed mode in accordance with the open/close patterns received from the open/close pattern setting unit 23, if the open/close patterns received from the feeding-pulse-energy changing unit 25a are different from those received from the open/close pattern setting unit 23, the oscillator 24 does not use the open/close patterns received from the open/close pattern setting unit 23, and outputs driving signals for performing the on-off control of the corresponding switching elements to supply the feeding pulse energy specified for the specified feeding path (one or both of the two one-side feeding paths) in accordance with the open/close patterns received from the feeding-pulse-energy changing unit 25a.

Accordingly, when there is imbalance in the machining energy that may cause wire breakage, in the inter-electrode gap at the time of one of the one-side feedings of the upper-side feeding and the lower-side feeding, the power feeding is performed based on the open/close patterns in which the feeding pulse energy at the time of the other one-side feeding is increased, enabling to prevent wire breakage at the time of the one-side feeding and improve machining speed.

When the power feeding is performed based on the open/close patterns that are received from the feeding-pulse-energy changing unit 25a and that are changed from those set by the open/close pattern setting unit 23 so that the feeding pulse energy is made different between the two one-side feedings and the upper-and-lower-both-side feeding in accordance with the magnitude of machining energy calculated by the machining-energy calculating unit 20 during the accumulating time period, wire breakage can be prevented and machining speed can be improved.

According to the second embodiment, the presence or absence of imbalance in the machining energy is determined based on the machining energy distribution obtained from the machining energy in a certain period from the present time to the past time, and when there is a difference in the machining energy between the upper and lower side feeding paths to the degree that causes wire breakage, power feeding is performed by switching the currently performed open/close patterns to those in which the feeding pulse energy per feeding pulse is changed to reduce the machining energy difference. Thus, wire breakage can be prevented more reliably.

Moreover, the power feeding is performed by switching the currently performed open/close patterns to those in which the feeding pulse energy per feeding pulse is changed to be different between the upper-and-lower-both-side feeding and the two one-side feedings in accordance with the magnitude of the machining energy in a certain period from the present time to the past time. Thus, wire breakage can be prevented and machining speed can be improved.

Third Embodiment

Figure 4:
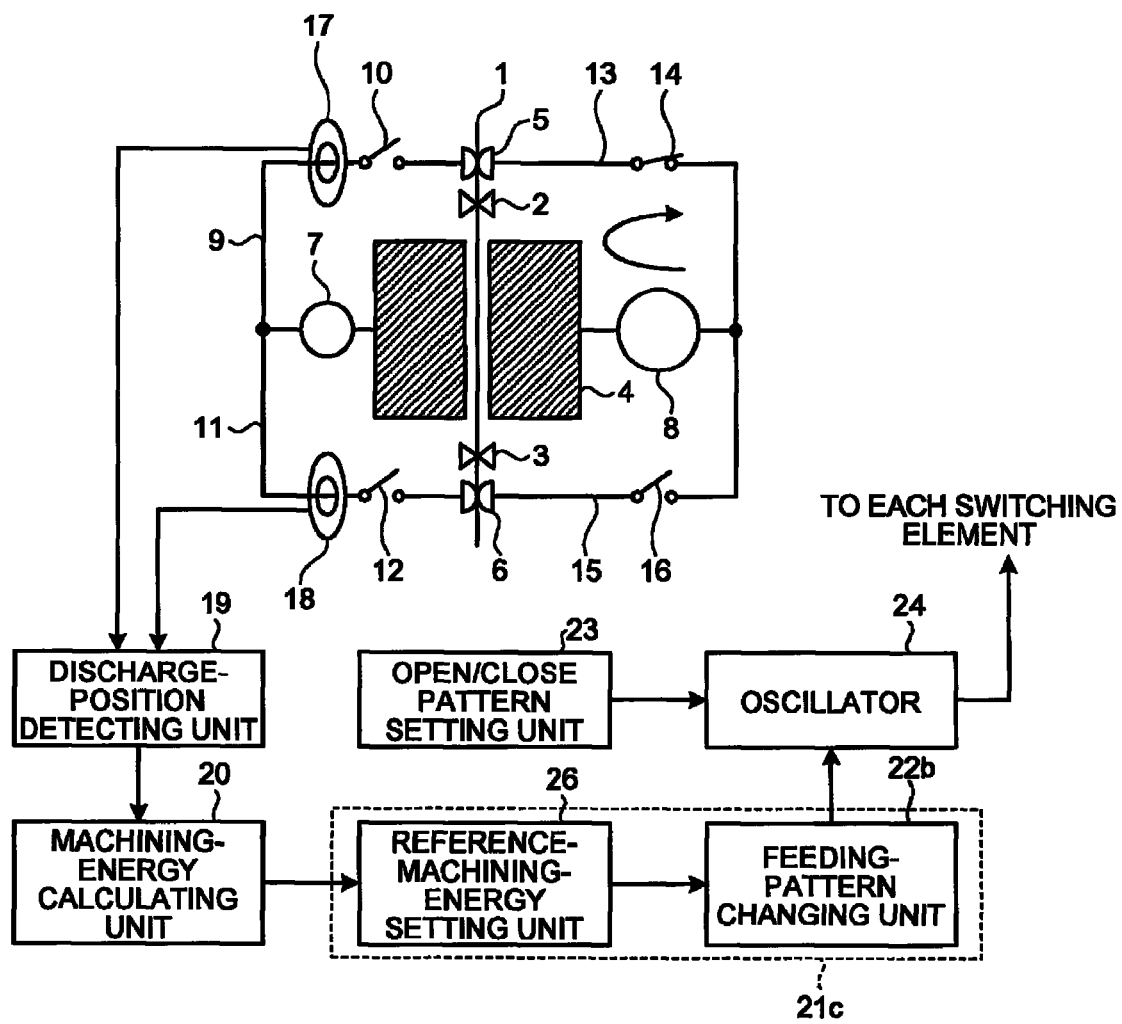
FIG. 4 is a schematic diagram illustrating a configuration of a relevant portion of a wire electrical discharge machining apparatus according to a third embodiment of the present invention.

FIG. 4 is a schematic diagram illustrating a configuration of a relevant portion of a wire electrical discharge machining apparatus according to the third embodiment of the present invention. In FIG. 4, the components that are the same or similar to those shown in FIG. 1 (first embodiment) are denoted by the same reference numerals. The components peculiar to the third embodiment are mainly explained below.

As shown in FIG. 4, the wire electrical discharge machining apparatus according to the third embodiment includes a machining-energy-distribution changing unit $21c$ instead of the machining-energy-distribution changing unit $21a$ in the configuration shown in FIG. 1 (first embodiment). The machining-energy-distribution changing unit $21c$ includes a reference-machining-energy setting unit 26 that receives the output from the machining-energy calculating unit 20 and a feeding-pattern changing unit $22b$ that receives the output from the reference-machining-energy setting unit 26, and the output from the feeding-pattern changing unit $22b$ is output to the oscillator 24.

Reference machining energy referred to as an output target of the machining-energy calculating unit 20 is set in the reference-machining-energy setting unit 26. When receiving the machining energy calculated during the appropriately set accumulating time period from the machining-energy calculating unit 20, the reference-machining-energy setting unit 26 outputs the received machining energy and the corresponding reference machining energy to the feeding-pattern changing unit $22b$.

The feeding-pattern changing unit $22b$ generates the open/close patterns in which the ratio of the number of power feedings is changed so that the machining energy calculated by the machining-energy calculating unit 20 is close to the reference machining energy, and outputs the generated open/close patterns to the oscillator 24.

Specifically, the feeding-pattern changing unit $22b$ changes the open/close patterns set by the open/close pattern setting unit 23 to those in which the ratio of the number of the upper-side feedings is low in the case where the machining energy calculated by the machining-energy calculating unit 20 is large on the upper end side or small on the lower end side in the machining gap with respect to the reference machining energy, and outputs the changed open/close patterns to the oscillator 24.

Moreover, the feeding-pattern changing unit $22b$ changes the open/close patterns set by the open/close pattern setting unit 23 to those in which the ratio of the number of the upper-side feedings is high in the case where the machining energy calculated by the machining-energy calculating unit 20 is small on the upper end side or large on the lower end side in the machining gap with respect to the reference machining energy, and outputs the changed open/close patterns to the oscillator 24.

Furthermore, the feeding-pattern changing unit $22b$ changes the open/close patterns set by the open/close pattern setting unit 23 to those in which the ratio of the number of the upper-and-lower-both-side feedings is low in the case where the machining energy calculated by the machining-energy calculating unit 20 is large on both of the upper and lower end sides in the machining gap with respect to the reference machining energy, and changes the open/close patterns set by the open/close pattern setting unit 23 to those in which the ratio of the number of the upper-and-lower-both-side feedings is high in the opposite case where the machining energy calculated by the machining-energy calculating unit 20 is small on both of the upper and lower end sides in the machining gap. Then, the feeding-pattern changing unit $22b$ outputs the changed open/close patterns to the oscillator 24.

In the first embodiment, a method is explained in which when there is imbalance in the machining energy, the open/close patterns are changed to realize a uniform machining energy distribution on the wire electrode thereby preventing wire breakage.

However, it is preferable in some cases to have a specific nonuniform machining energy distribution in accordance with the discharge positions instead of having a uniform machining energy distribution on the wire electrode. In the third embodiment, such case can be coped with by setting the specific nonuniform distribution as the reference machining energy in the reference-machining-energy setting unit 26. Two specific application examples are explained.

A first application example is explained for a case of preventing wire breakage that may occur due to wearing of the wire electrode. The wire electrode 1 is conveyed from the upper side to the lower side of the workpiece 4. While moving from the upper end side to the lower end side in the machining gap, the wire electrode 1 wears and becomes thin due to discharging. Particularly, when moving speed of the wire electrode 1 is low or the energy per discharge pulse is large, an amount of wear of the wire electrode 1 increases. Therefore, if the machining energy is uniform when the discharge position is at the upper and lower end sides in the machining gap, breakage of the wire electrode 1 easily occurs at a position corresponding to the lower end side of the machining gap.

Thus, when the degree of the wire electrode wearing is large, the reference machining energy is set so that the machining energy is small in the case where the discharge position is on the lower end side in the machining gap compared with the case where the discharge position is on the upper end side. Accordingly, the machining energy of the thinned wire electrode 1 due to wearing becomes small at a position corresponding to the lower end side in the machining gap, enabling to prevent wire breakage.

A second application example is explained for a case of preventing wire breakage that may occur when the amount of machining swarf accumulated in the machining gap is different between the upper and lower end sides in the machining gap. As described above, the machining liquid nozzles are provided on the upper and lower sides of the workpiece 4 on an axis coaxial to the wire electrode 1 in the wire electrical discharge machining apparatus, and machining liquid is ejected from the machining liquid nozzles into the machining gap between the wire electrode 1 and the workpiece 4 to remove machining swarf. The machining liquid flows into the machining gap from above and below become different depending upon the positions at which the machining nozzles are arranged. Machining swarf tends to be accumulated on a side with less machining liquid flow in the machining gap, which results in high discharge frequency, so that wire breakage easily occurs on this side.

When the machining liquid flows less on the upper end side in the machining gap, wire breakage easily occurs at a position corresponding to the upper end side in the machining gap. Therefore, when the discharge position is on the upper end side in the machining gap, the reference machining energy is set so that the machining energy is smaller than the case where the discharge position is on the lower end side.

On the contrary, when the machining liquid flows less on the lower end side in the machining gap, wire breakage easily occurs at a position corresponding to the lower end side in the machining gap. Therefore, when the discharge position is on the lower end side in the machining gap, the reference machining energy is set so that the machining energy is smaller than the case where the discharge position is on the upper end side.

Because the amount of the machining liquid flowing into the machining gap respectively from the upper end side and the lower end side is different, the machining energy is small when the wire electrode 1 is at a position corresponding to the upper or lower end side in the machining gap in which less machining liquid flows and the discharge frequency is high, enabling to prevent wire breakage.

According to the third embodiment, the reference machining energy is preset as a target value of the machining energy in a certain period from the present time to the past time, and the power feeding is performed by switching the currently performed open/close patterns to those in which the ratio of the number of power feedings is changed to reduce the machining energy difference based on the magnitude relation between both energies. Thus, wire breakage can be prevented more reliably.

In addition, wire breakage due to, for example, wearing of the wire electrode or imbalance of the machining liquid flow in the up-down direction can be prevented by setting the reference machining energy to provide a specific nonuniform distribution corresponding to the discharge position.

Fourth Embodiment

Figure 5:
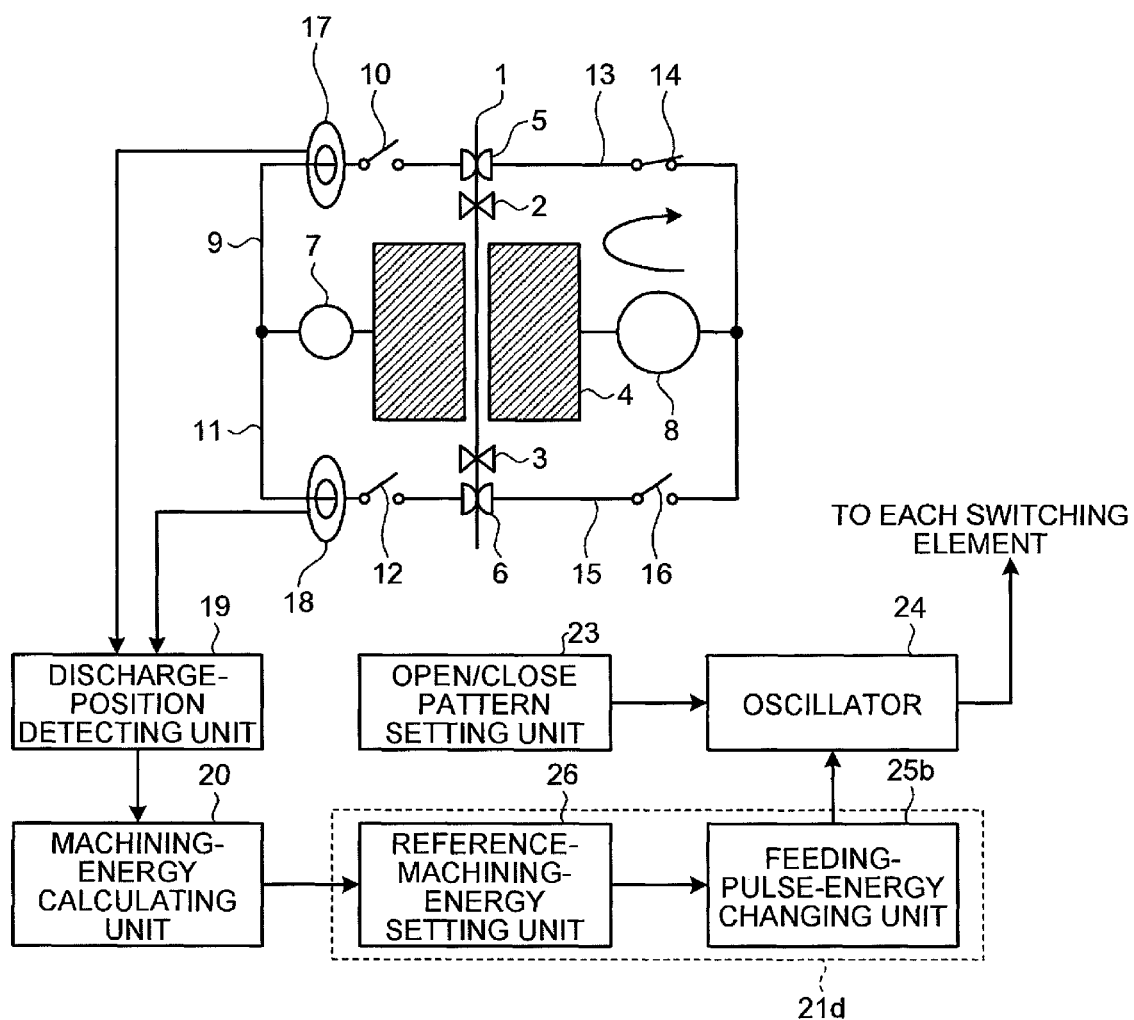
FIG. 5 is a schematic diagram illustrating a configuration of a relevant portion of a wire electrical discharge machining apparatus according to a fourth embodiment of the present invention.

FIG. 5 is a schematic diagram illustrating a configuration of a relevant portion of a wire electrical discharge machining apparatus according to the fourth embodiment of the present invention. In FIG. 5, the components that are the same or similar to those shown in FIG. 1 (first embodiment) are denoted by the same reference numerals. The components peculiar to the fourth embodiment are mainly explained below.

As shown in FIG. 5, the wire electrical discharge machining apparatus according to the fourth embodiment includes a machining-energy-distribution changing unit 21d instead of the machining-energy-distribution changing unit 21a in the configuration shown in FIG. 1 (first embodiment). The machining-energy-distribution changing unit 21d includes the reference-machining-energy setting unit 26 that receives the output from the machining-energy calculating unit 20 and a feeding-pulse-energy changing unit 25b that receives the output from the reference-machining-energy setting unit 26, and the output from the feeding-pulse-energy changing unit 25b is output to the oscillator 24. Because the reference-machining-energy setting unit 26 is explained in the third embodiment, the feeding-pulse-energy changing unit 25b that changes the feeding pulse energy per feeding pulse is explained here. As explained in the second embodiment, the method of changing the feeding pulse energy includes the method of increasing or decreasing a feeding current value and the method of increasing or decreasing a feeding time length, any of which can be employed.

The feeding-pulse-energy changing unit 25b generates open/close patterns in which the feeding pulse energy per feeding pulse is changed to be close to the reference machining energy and outputs the generated open/close patterns to the oscillator 24.

Specifically, the feeding-pulse-energy changing unit 25b changes to open/close patterns in which the feeding pulse energy per feeding pulse is made small at the time of the upper-side feeding in the case where the machining energy calculated by the machining-energy calculating unit 20 is large on the upper end side in the machining gap with respect to the reference machining energy, and outputs the changed open/close patterns to the oscillator 24.

Moreover, the feeding-pulse-energy changing unit 25b changes to open/close patterns in which the feeding pulse energy per feeding pulse is made large at the time of the upper-side feeding in the case where the machining energy calculated by the machining-energy calculating unit 20 is small on the upper end side in the machining gap with respect to the reference machining energy, and outputs the changed open/close patterns to the oscillator 24.

Furthermore, the feeding-pulse-energy changing unit 25b changes to open/close patterns in which the feeding pulse energy per feeding pulse is made small at the time of the lower-side feeding in the case where the machining energy calculated by the machining-energy calculating unit 20 is large on the lower end side in the machining gap with respect to the reference machining energy, and outputs the changed open/close patterns to the oscillator 24.

Furthermore, the feeding-pulse-energy changing unit 25b changes to open/close patterns in which the feeding pulse energy per feeding pulse is made large at the time of the lower-side feeding in the case where the machining energy calculated by the machining-energy calculating unit 20 is small on the lower end side in the machining gap with respect to the reference machining energy, and outputs the changed open/close patterns to the oscillator 24.

Furthermore, the feeding-pulse-energy changing unit 25b changes to open/close patterns in which the feeding pulse energy per feeding pulse is made large at the time of the upper-and-lower-both-side feeding in the case where the machining energy calculated by the machining-energy calculating unit 20 is small on both of the upper and lower end sides in the machining gap with respect to the reference machining energy, and changes to open/close patterns in which the feeding pulse energy per feeding pulse is made small at the time of the upper-and-lower-both-side feeding in the case where the machining energy is large on both of the upper and lower end sides in the machining gap. Then, the feeding-pulse-energy changing unit 25b outputs the changed open/close patterns to the oscillator 24.

With this configuration also, the reference machining energy can be set to provide a specific nonuniform distribution corresponding to the discharge position, so that wire breakage due to wearing of the wire electrode or imbalance of the amount of the machining liquid flow in the up-down direction can be prevented.

According to the fourth embodiment, the reference machining energy is preset as a target value of the machining energy in a certain period from the present time to the past time, and the power feeding is performed by switching the currently performed open/close patterns to those in which the feeding pulse energy per feeding pulse is changed to reduce the machining energy difference based on the magnitude relation between both energies. Thus, wire breakage can be prevented more reliably.

In addition, wire breakage due to, for example, wearing of the wire electrode or imbalance of the amount of the machining liquid flow in the up-down direction can be prevented by setting the reference machining energy to provide a specific nonuniform distribution corresponding to the discharge position.

In the third and fourth embodiments, each of the machining-energy-distribution changing units 21c, 21d includes the reference-machining-energy setting unit 26, and the feeding-pattern changing unit 22b or the feeding-pulse-energy changing unit 25b, however, can include only the reference-machining-energy setting unit 26. Even with such configuration, the machining energy distribution can be made close to an optimal one by generating open/close patterns in which the machining-energy-distribution is changed to reduce the difference between the machining energy calculated by the machining-energy calculating unit 20 and the reference machining energy. Therefore, wire breakage can be prevented. Thus, wire breakage due to wearing of the wire electrode or imbalance of the amount of the machining liquid flow in the up-down direction can be prevented similarly to the above.

INDUSTRIAL APPLICABILITY

As described above, a wire electrical discharge machining apparatus according to the present invention is advantageously used to improve machining speed by preventing wire breakage due to imbalance in the machining energy that occurs in the inter-electrode gap.

The invention claimed is:

1. A wire electrical discharge machining apparatus, comprising an upper-side path that passes through an upper-side feeding point on which a wire electrode is slidable on an upper side of a workpiece and a lower-side path that passes through a lower-side feeding point on which the wire electrode is slidable on a lower side of the workpiece as feeding paths for supplying a discharge current from a machining power supply to an inter-electrode gap that is a machining gap between the wire electrode and the workpiece, the wire electrical discharge machining apparatus further comprising:
  an upper-side-path open/close unit and a lower-side-path open/close unit capable of separately opening and closing the upper-side path and the lower-side path;
  an open/close pattern setting unit that performs power feeding in a manner in which a one-side feeding system using either one of the upper-side path and the lower-side path and an upper-and-lower-both-side feeding system simultaneously using both of the upper-side path and the lower-side path are mixed, and sets an open/close pattern for controlling opening and closing of the upper-side-path open/close unit and the lower-side-path open/close unit separately or simultaneously, as an instruction for realizing a desired feeding mode in each of the one-side feeding system and the upper-and-lower-both-side feeding system;
  a discharge position detecting unit that detects a discharge position based on any of a sub discharge current value and a main discharge current value supplied from the upper-side feeding point and the lower-side feeding point to the inter-electrode gap;
  a machining energy calculating unit that calculates a machining energy at a present position of the wire electrode based on the main discharge current value for every discharge position that is detected by the discharge position detecting unit in a certain period from a present time to a past time;
  a machining-energy-distribution changing unit that, when there is imbalance in machining energy distribution in an up-down direction of the machining gap obtained based on the machining energy calculated by the machining energy calculating unit, generates a new open/close pattern in which the machining energy distribution is changed to obtain a predetermined machining energy distribution for eliminating the imbalance; and
  a driving unit that, upon receiving the new open/close pattern from the machining energy distribution changing unit, performs an open/close control of the upper-side-path open/close unit and the lower-side-path open/close unit, which is to be performed in accordance with an open/close pattern from the open/close pattern setting unit, in accordance with the new open/close pattern.

2. The wire electrical discharge machining apparatus according to claim 1, wherein the machining-energy-distribution changing unit, when there is imbalance in the machining energy, generates the new open/close pattern in which the machining energy distribution is changed to reduce a machining energy difference between an upper end side and a lower end side of the machining gap.

3. The wire electrical discharge machining apparatus according to claim 1, wherein the machining-energy-distribution changing unit, when there is imbalance in the machining energy, generates the new open/close pattern in which the machining energy calculated by the machining energy calculating unit is changed to be close to a preset appropriate machining energy.

4. The wire electrical discharge machining apparatus according to claim 1, wherein the machining-energy-distribution changing unit includes a feeding pattern changing unit that changes the open/close pattern set by the open/close pattern setting unit to the new open/close pattern in which a ratio between number of power feedings from the upper-side path and number of power feedings from the lower-side path is made different, depending upon a magnitude of present imbalance in the machining energy.

5. The wire electrical discharge machining apparatus according to claim 1, wherein the machining-energy-distribution changing unit includes a feeding pattern changing unit that changes the open/close pattern set by the open/close pattern changing unit to the new open/close pattern in which a ratio of number of power feedings is made different between the two one-side feedings and the upper-and-lower-both-side feeding, depending upon a magnitude of the machining energy calculated by the machining energy calculating unit.

6. The wire electrical discharge machining apparatus according to claim 1, wherein the machining-energy-distribution changing unit includes a feeding-pulse-energy changing unit that changes the open/close pattern set by the open/close pattern setting unit to the new open/close pattern in which a feeding pulse energy per feeding pulse is made different between at a time of power feeding using the upper-side path and at a time of power feeding using the lower-side path to cause the machining energy calculated by the machining energy calculating unit to be close to a preset appropriate machining energy, depending upon a magnitude of present imbalance of the machining energy.

7. The wire electrical discharge machining apparatus according to claim 1, wherein the machining-energy-distribution changing unit includes a feeding-pulse-energy changing unit that changes the open/close pattern set by the open/close pattern setting unit to the new open/close pattern in which a feeding pulse energy per feeding pulse is made different between the two one-side feedings and the upper-and-lower-both-side feeding, depending upon a magnitude of the machining energy calculated by the machining energy calculating unit.

8. The wire electrical discharge machining apparatus according to claim 1, wherein the machining-energy-distribution changing unit includes a reference-machining-energy setting unit that sets a reference machining energy that provided a target value for the machining energy to be calculated by the machining energy calculating unit, and generates the new open/close pattern in which the machining energy distribution is changed to reduce a difference between the machining energy calculated by the machining energy calculating unit and the reference machining energy.

9. The wire electrical discharge machining apparatus according to claim 1, wherein the machining-energy-distribution changing unit includes a reference-machining-energy setting unit that sets a reference machining energy that provides a target value for the machining energy to be calculated by the machining energy calculating unit and provides a machining energy value that is different between an upper end side and a lower end side of the machining gap, and generates the new open/close pattern in which the machining energy distribution is changed to reduce a difference between the machining energy calculated by the machining energy calculating unit and the reference machining energy.

10. The wire electrical discharge machining apparatus according to claim 1, wherein the machining-energy-distribution changing unit includes
a reference-machining-energy setting unit that sets a reference machining energy that provides a target value for the machining energy to be calculated by the machining energy calculating unit; and
a feeding pattern changing unit that changes the open/close pattern set by the open/close pattern setting unit to the new open/close pattern in which a ratio of number of power feedings is made different between the two one-side feedings and the upper-and-lower-both-side feeding to reduce a difference between the machining energy calculated by the machining energy calculating unit and the reference machining energy.

11. The wire electrical discharge machining apparatus according to claim 1, wherein the machining-energy-distribution changing unit includes
a reference-machining-energy setting unit that sets a reference machining energy that provides a target value for the machining energy to be calculated by the machining energy calculating unit and provides a machining energy value that is different between an upper end side and a lower end side of the machining gap; and
a feeding pattern changing unit that changes the open/close pattern set by the open/close pattern setting unit to the new open/close pattern in which a ratio of number of power feedings is made different between the two one-side feedings and the upper-and-lower-both-side feeding to reduce a difference between the machining energy calculated by the machining energy calculating unit and the reference machining energy.

12. The wire electrical discharge machining apparatus according to claim 1, wherein the machining-energy-distribution changing unit includes
a reference-machining-energy setting unit that sets a reference machining energy that provides a target value for the machining energy to be calculated by the machining energy calculating unit; and
a feeding pulse energy changing unit that changes the open/close pattern set by the open/close pattern setting unit to the open/close pattern in which a feeding pulse energy per feeding pulse is made different between at a time of power feeding using the upper-side path and at a time of power feeding using the lower-side path to reduce a difference between the machining energy calculated by the machining energy calculating unit and the reference machining energy.

13. The wire electrical discharge machining apparatus according to claim 1, wherein the machining-energy-distribution changing unit includes
a reference-machining-energy setting unit that sets a reference machining energy that provides a target value for the machining energy to be calculated by the machining energy calculating unit and provides a machining energy value that is different between an upper end side and a lower end side of the machining gap; and
a feeding pulse energy changing unit that changes the open/close pattern set by the open/close pattern setting unit to the open/close pattern in which a feeding pulse energy per feeding pulse is made different between at a time of power feeding using the upper-side path and at a time of power feeding using the lower-side path to reduce a difference between the machining energy calculated by the machining energy calculating unit and the reference machining energy.

14. The wire electrical discharge machining apparatus according to claim 1, wherein the machining-energy-distribution changing unit includes
a reference-machining-energy setting unit that sets a reference machining energy that provides a target value for the machining energy to be calculated by the machining energy calculating unit; and
a feeding pulse energy changing unit that changes the open/close pattern set by the open/close pattern setting unit to the open/close pattern in which a feeding pulse energy per feeding pulse is made different between at a time of power feeding using the two one-sides and at a time of power feeding using the upper-and-lower-both-side to reduce a difference between the machining energy calculated by the machining energy calculating unit and the reference machining energy.

15. The wire electrical discharge machining apparatus according to claim 1, wherein the machining-energy-distribution changing unit includes
a reference-machining-energy setting unit that sets a reference machining energy that provides a target value for the machining energy to be calculated by the machining energy calculating unit and provides a machining energy value that is different between an upper end side and a lower end side of the machining gap; and
a feeding pulse energy changing unit that changes the open/close pattern set by the open/close pattern setting unit to the open/close pattern in which a feeding pulse energy per feeding pulse is made different between at a time of power feeding using the two one-sides and at a time of power feeding using the upper-and-lower-both-side to reduce a difference between the machining energy calculated by the machining energy calculating unit and the reference machining energy.

* * * * *